United States Patent
Pan et al.

(10) Patent No.: US 8,872,521 B2
(45) Date of Patent: Oct. 28, 2014

(54) ELECTRICAL PARAMETER DETECTION DEVICE FOR PERIPHERAL COMPONENT INTERCONNECT DEVICES

(75) Inventors: Ya-Jun Pan, Shenzhen (CN); Qi-Yan Luo, Shenzhen (CN); Peng Chen, Shenzhen (CN); Song-Lin Tong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 336 days.

(21) Appl. No.: 13/424,394

(22) Filed: Mar. 20, 2012

(65) Prior Publication Data
US 2013/0127447 A1    May 23, 2013

(30) Foreign Application Priority Data
Nov. 21, 2011    (CN) .......................... 2011 1 0370981

(51) Int. Cl.
*G06F 11/22*    (2006.01)

(52) U.S. Cl.
CPC ................................... *G06F 11/221* (2013.01)
USPC ............................ 324/522; 324/500; 324/555

(58) Field of Classification Search
CPC ...... G01R 1/408; G01R 19/25; G01R 21/133; G01R 29/18; G01R 31/2886; G01R 31/2889
USPC ................. 324/160, 500, 512, 522, 538, 555, 324/756.07, 764.01
See application file for complete search history.

(56) References Cited

U.S. PATENT DOCUMENTS

| | | | |
|---|---|---|---|
| 5,712,754 A * | 1/1998 | Sides et al. | 361/58 |
| 6,529,987 B1 * | 3/2003 | Reid | 710/302 |
| 2007/0136025 A1 * | 6/2007 | Lo et al. | 702/122 |
| 2010/0301886 A1 * | 12/2010 | Chin et al. | 324/755 |

* cited by examiner

*Primary Examiner* — Arleen M Vazquez
*Assistant Examiner* — Nichole Nguyen
(74) *Attorney, Agent, or Firm* — Novak Druce Connolly Bove + Quigg LLP

(57) ABSTRACT

An electrical parameter detection device is configured for detecting electrical parameters of a peripheral component interconnect (PCI) connector including a plurality of power pins. The electrical parameter detection device includes a processor module, a first detection module, and a second detection module. The processor module continuously detects voltage values of electric potentials provided by each of the power pins of the PCI connector using the first detection module, and determines time sequences of the electric potentials according to the voltage values of the electric potentials. Furthermore, the processor module detects the amount of power provided by each of the power pins of the PCI connector using the second detection module.

8 Claims, 3 Drawing Sheets

US 8,872,521 B2

ELECTRICAL PARAMETER DETECTION DEVICE FOR PERIPHERAL COMPONENT INTERCONNECT DEVICES

BACKGROUND

1. Technical Field

The present disclosure relates to peripheral component interconnect (PCI) technology, and particularly to an electrical parameter detection device for PCI devices.

2. Description of Related Art

A peripheral component interconnect (PCI) connector includes a plurality of power pins. These power pins can respectively provide electric potentials of various predetermined voltage values to PCI devices, such as sound cards and network cards. However, due to inherent characteristics of PCI connectors, the electric potentials output from these power pins may have different time sequences (i.e., changing patterns of the electric potentials over time). The differences between the time sequences of these electric potentials may cause failures of electronic connections between the PCI connector and PCI devices connected to the PCI connector. Furthermore, because it is generally difficult to detect the time sequences of these electric potentials, it may be very difficult to establish and clear such failures.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
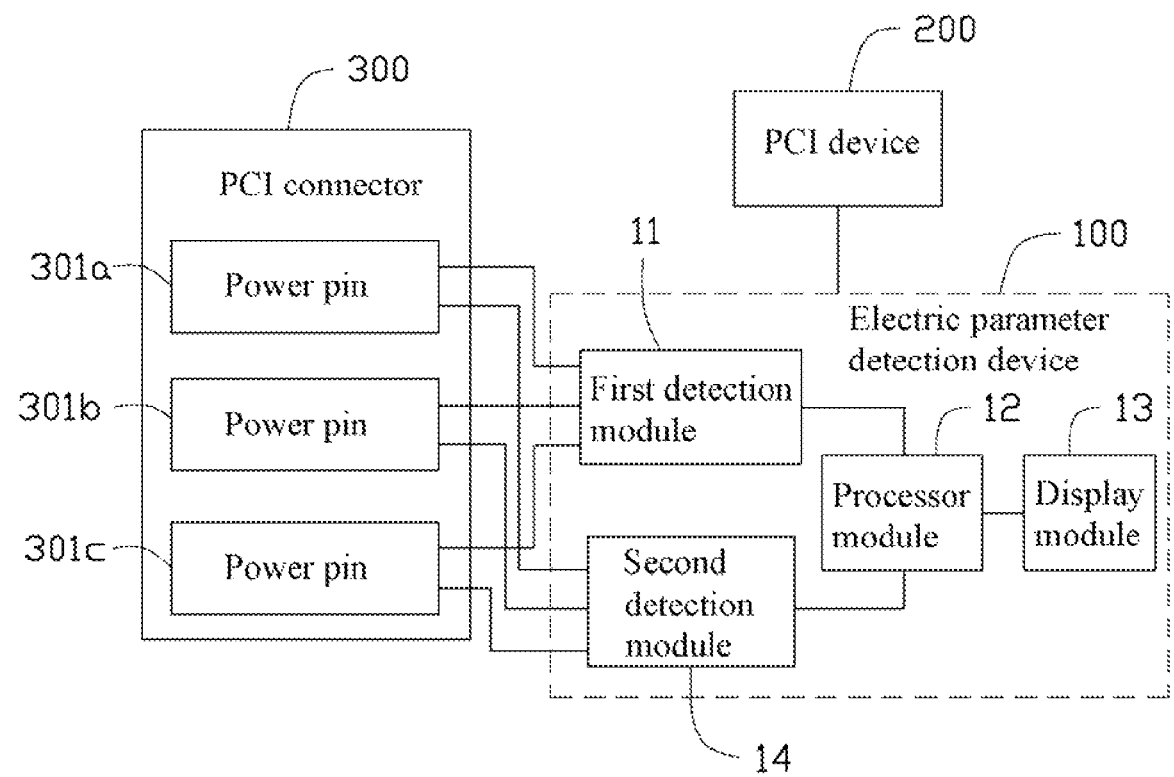
FIG. 1 is a block diagram of an electrical parameter detection device for peripheral component interconnect (PCI) devices, according to an exemplary embodiment.

FIG. 1 shows an electrical parameter detection device 100 for peripheral component interconnect (PCI) devices, according to an exemplary embodiment. A PCI device 200, such as a sound card or a network card, is connected to a PCI connector 300 via the electrical parameter detection device 100. The PCI connector 300 includes a plurality of power pins 301a, 301b, and 301c, and these power pins 301a, 301b, 301c can provide electric potentials of various predetermined voltage values to the PCI device 200 via the electrical parameter detection device 100. In this embodiment, the power pins 301a, 301b, and 301c can respectively output electric potentials with voltage values of 5V, 3.3V, and 12V, for example. The electrical parameter detection device 100 can detect electrical parameters of the PCI connector 300, such as any changing patterns of the electric potentials over time (time sequences) and power of the electric potentials provided to the PCI device 200 by the PCI connector 300.

The electrical parameter detection device 100 includes a first detection module 11, a second detection module 14, a processor module 12, and a display module 13. Each of the power pins 301 is electrically connected to both the first detection module 11 and the second detection module 14. The first detection module 11, the second detection module 14, and the display module 13 are all electrically connected to the processor module 12.

Figure 2:
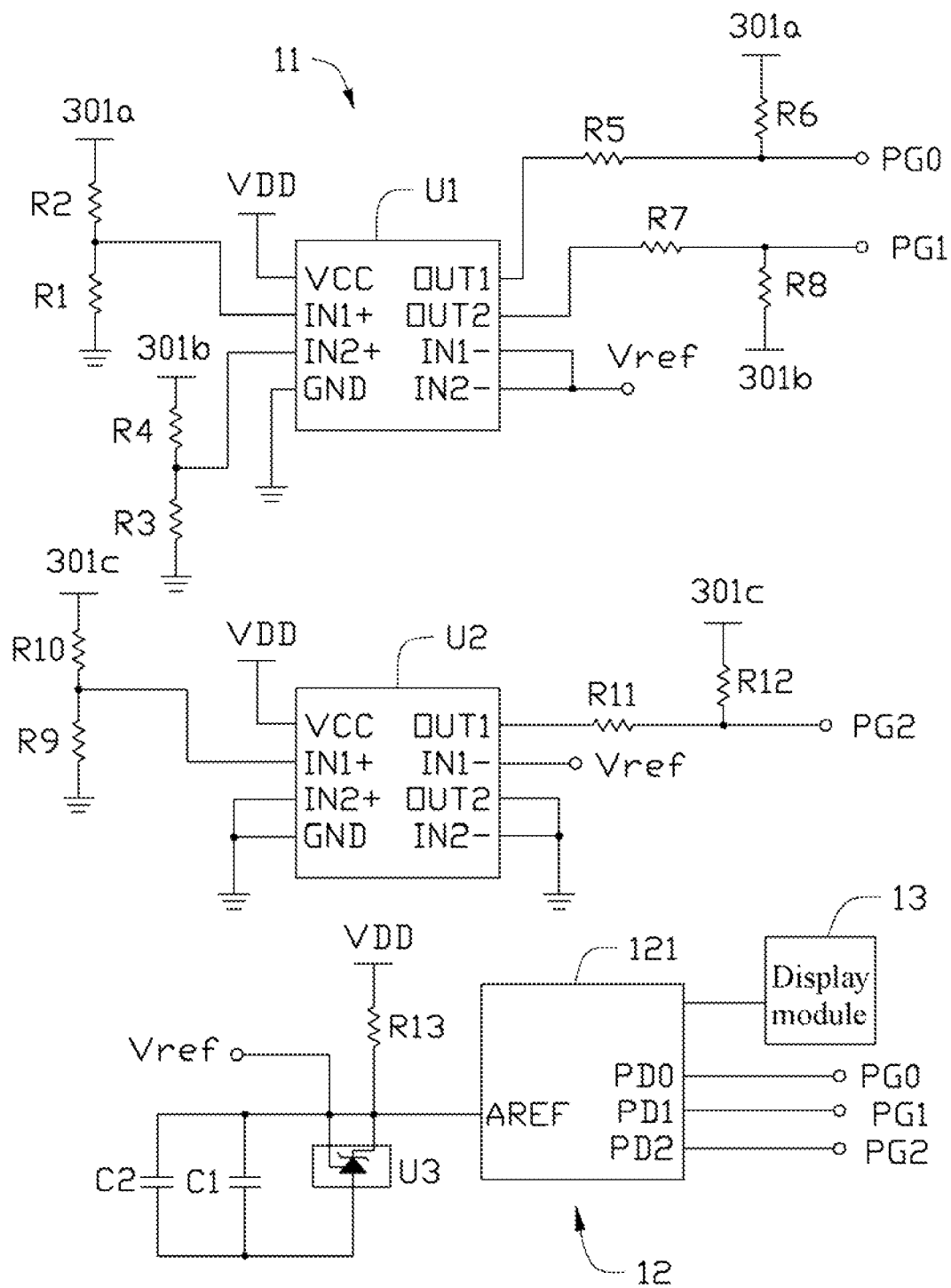
FIG. 2 is a circuit diagram of a first detection module, a processor module, and a display module of the electrical parameter detection device shown in FIG. 1.

Also referring to FIG. 2, the first detection module 11 is configured for detecting time sequences of the electric potentials provided by the PCI connector 300. The first detection module 11 includes a first comparator unit U1, a second comparator unit U2, a group of resistors R1-R12, and three feedback pins PG0, PG1, PG2 respectively corresponding to the power pins 301a, 301b, 301c. Both the first comparator unit U1 and the second comparator unit U2 can be LM393 chips, and each of the first comparator unit U1 and the second comparator unit U2 has a chip power pin VCC, a grounding pin GND, two negative input pins IN1−, IN2−, two positive input pins IN1+, IN2+, and two output pins OUT1, OUT2.

The chip power pin VCC of the first comparator unit U1 is electrically connected to a working power supply VDD to receive working electric power. The grounding pin GND of the first comparator unit U1 is grounded. Both the two negative input pins IN1−, IN2− of the first comparator unit U1 receive a predetermined reference electric potential Vref. The power pin 301a is electrically connected to ground via two resistors R1, R2 connected in series, and the positive input pin IN1+ of the first comparator unit U1 is electrically connected between the two resistors R1, R2. The power pin 301b is electrically connected to ground via two resistors R3, R4 connected in series, and the positive input pin IN2+ of the first comparator unit U1 is electrically connected between the two resistors R3, R4. Furthermore, the power pin 301a is electrically connected to the output pin OUT1 of the first comparator unit U1 via two resistors R5, R6 connected in series, and the feedback pin PG0 is electrically connected between the two resistors R5, R6. The power pin 301b is electrically connected to the output pin OUT2 of the first comparator unit U1 via two resistors R7, R8 connected in series, and the feedback pin PG1 is electrically connected between the two resistors R7, R8.

The chip power pin VCC of the second comparator unit U2 is also electrically connected to the working power supply VDD to receive working electric power. The grounding pin GND, the positive input pin IN2+, the negative input pin IN2−, and the output pin OUT2 of the second comparator unit U2 are all grounded. The negative input pin IN1− of the second comparator unit U2 receives the reference electric potential Vref. The power pin 301c is electrically connected to the ground via two resistors R9, R10 connected in series, and the positive input pin IN1+ of the second comparator unit U2 is electrically connected between the two resistors R9, R10. The power pin 301c is further electrically connected to the output pin OUT1 of the second comparator unit U2 via two resistors R11, R12 connected in series, and the feedback pin PG2 is electrically connected between the two resistors R11, R12.

The processor module 12 includes a processor 121, a voltage regulator U3, a resistor R13, and two capacitor C1, C2. The processor 121 can be a single-chip computer. The processor 121 has a reference electric potential output pin AREF and a plurality of detection pins PD0, PD1, PD2 respectively corresponding to the feedback pins PG0, PG1, PG2. The voltage regulator U3 has an anode, a cathode, and a reference terminal. Both the cathode and the reference terminal are electrically connected to the reference electric potential output pin AREF. The capacitors C1, C2 are connected in parallel between the anode and the reference terminal. The reference terminal is electrically connected to the negative input pins IN1−, IN2− of the first comparator unit U1 and the negative input pin IN1− of the second comparator unit U2 to provide the reference electric potential Vref. The working power supply VDD is electrically connected to the reference electric potential output pin AREF via the resistor R13. The detection pins PD0, PD1, PD2 are respectively electrically connected to the feedback pins PG0, PG1, PG2. The display module 13 is electrically connected to the processor 121.

Figure 3:
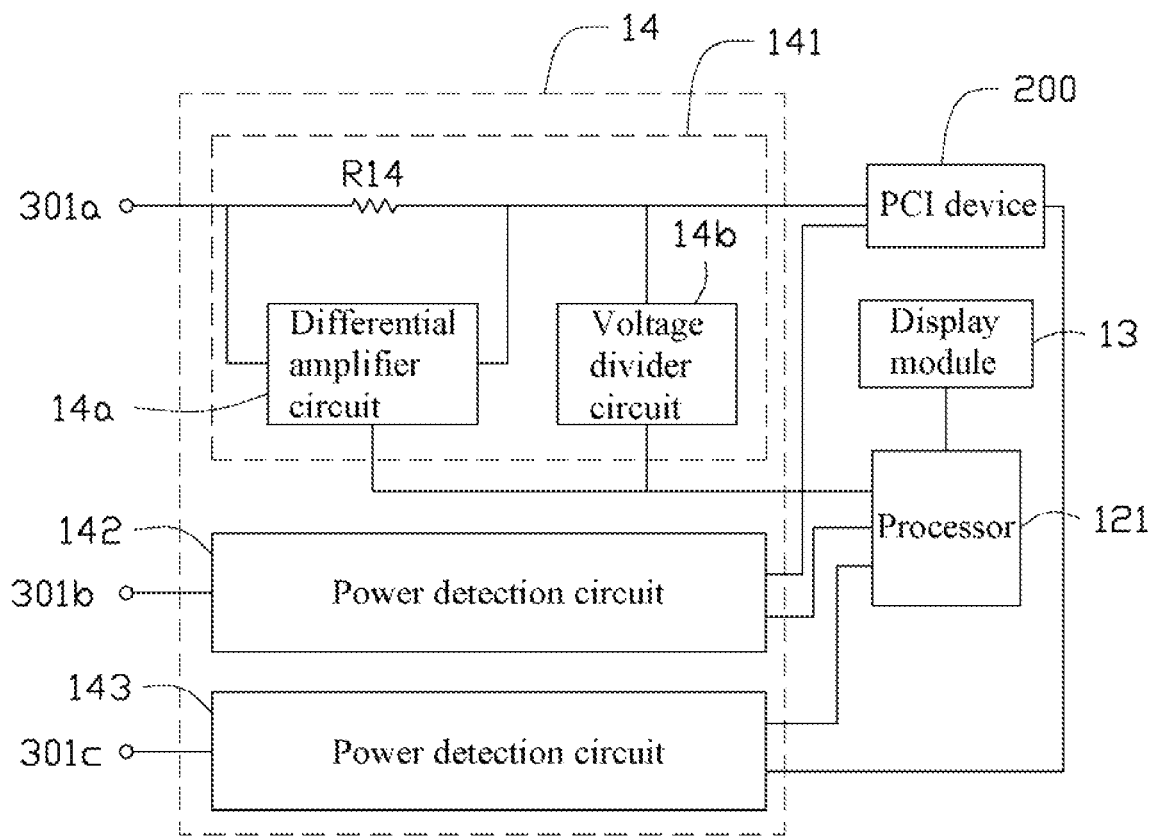
FIG. 3 is a block diagram of a second detection module of the electrical parameter detection device shown in FIG. 1.

Also referring to FIG. 3, the second detection module 14 is configured for detecting power provided to the PCI device 200 by the PCI connector 300. The second detection module 14 includes a plurality of power detection circuits 141, 142, 143 corresponding to the power pins 301a, 301b, 301c. The power pins 301a, 301b, 301c are electrically connected to the PCI device 200 via the respective power detection circuits 141, 142, 143, and thus provide the electric potentials to the PCI device 200 via the power detection circuits 141, 142, 143. The power detection circuits 141, 142, 143 are all electrically connected to the processor module 12.

Each of the power detection circuits 141, 142, 143 includes a differential amplifier circuit 14a, a voltage divider circuit 14b, and a resistor R14. In each of the power detection circuits 141, 142, 143, the differential amplifier circuit 14a and the resistor R14 are electrically connected in parallel between the power pin 301a/301b/301c corresponding to the power detection circuit 141/142/143 and the PCI device 200. The voltage divider circuit 14b is electrically connected between the resistor R14 and the PCI device 200. Both the differential amplifier circuit 14a and the voltage divider circuit 14b are electrically connected to the processor 121.

In use, the power pins 301a, 301b, and 301c respectively output electric potentials with voltage values of 5V, 3.3V, and 12V to the PCI device 200 via the power detection circuits 141, 142, 143. The processor 12 outputs a predetermined electric potential to the voltage regulator U3 and correspondingly generates the reference electric potential Vref. The reference electric potential Vref is transmitted to the negative input pins IN1−, IN2− of the first comparator unit U1 and the negative input pin IN1− of the second comparator unit U2. The capacitors C1, C2 can filter any unwanted alternating portions of the reference electric potential Vref. The resistor R13 serves as a pull-up resistor to hold the reference electric potential Vref at a predetermined value.

According to inherent characteristics of LM393 chips, in each of the first comparator unit U1 and the second comparator unit U2, the positive input pin IN1+, the negative input pin IN1−, and the output pin OUT1 form one comparator circuit, and the positive input pin IN2+, the negative input pin IN2−, and the output pin OUT2 form another comparator circuit. In each of the comparators, the output pin OUT1/OUT2 outputs a relatively higher voltage level (e.g., a predetermined logic 1) when an electric potential on the positive input pin IN1+/IN2+ is higher than an electric potential on the negative input pin IN1−/IN2−, and outputs a relatively lower voltage level (e.g., a predetermined logic 0) when the electric potential on the positive input pin IN1+/IN2+ is lower than the electric potential on the negative input pin IN1−/IN2−.

Thus, the first comparator unit U1 compares the electric potentials provided by the power pins 301a, 301b with the reference electric potential Vref, and the second comparator unit U2 compares the electric potential provided by the power pins 301c with the reference electric potential Vref. The output pin OUT1 of the first comparator U1 outputs the relatively higher voltage level to the processor 121 via the feedback pin PG0 and the detection pin PD0 when the electric potential provided by the power pin 301a is higher than the reference electric potential Vref, and outputs the relatively lower voltage level to the processor 121 via the feedback pin PG0 and the detection pin PD0 when the electric potential provided by the power pin 301a is lower than the reference electric potential Vref. In this way, the processor 121 can continuously detect changes in voltage values of the electric potential provided by the power pin 301a. According to the voltage value changes of the electric potential provided by the power pin 301a detected within predetermined periods, the processor 121 can determine the time sequence of the electric potential provided by the power pin 301a. By similar methods, the processor 121 can detect voltage value changes of the electric potentials provided by the power pins 301b and 301c, and determine the time sequences of the electric potentials provided by those power pins. The display module 13 can display the time sequences (e.g., in the form of waveforms or the like) of the electric potentials of the power pins 310a, 301b, and 310c.

The second detection module 14 is used to detect power provided to the PCI device 200 by the PCI connector 300. In each of the power detection circuits 141, 142, and 143, the differential amplifier circuit 14a amplifies any difference between electric potentials on two ends of the resistor R14. The processor 121 obtains an amplified value of the electrical potential difference from the differential amplifier circuit 14a, and calculates a value of current passing through the resistor R14 according to the amplified value of the electrical potential difference, an amplifying multiple of the differential amplifier circuit, and a resistance value of the resistor R14. The current passing through the resistor R14 substantially equates the amount of current provided to the PCI device 200 by the power pin 301a/301b/301c corresponding to the power detection circuit 141/142/143. At the same time, through the voltage divider circuit 14b, the processor 121 detects a value of the electric potential provided to the PCI device 200 by the power pin 301a/301b/301c corresponding to the power detection circuit 141/142/143. In this way, the processor 121 can calculate individual power levels provided to the PCI device 200 by each of the power pins 301a, 301b, and 301c. Values of the electric potential, the amount of current, and thus power provided to the PCI device 200 by each of the power pins 301a, 301b, 301c can be displayed by the display module 13.

According to the above-described disclosure, the electrical parameter detection device 100 can detect power and time sequences of the electric potentials provided to the PCI device 200 by each of the power pins 301a, 301b, 301c of the PCI connector 300. If any differences between the time sequences of the electric potentials provided by the power pins 301a, 301b, 301c cause a failure of the PCI device 200, it is easy to establish reasons of the failure and take action to clear the failure according to the time sequences of the electric potentials provided by the power pins 301a, 301b, 301c.

In this embodiment, the comparator of the second comparator unit U2, which comprises the positive input pin IN2+, the negative input pin IN2−, and the output pin OUT2, is idle. If the PCI connector 300 has four power pins, the fourth power pin can be electrically connected to this comparator, according to the above-described method. Correspondingly, the processor 121 can include a fourth detection pin electrically connected to the comparator for detecting the time sequence of an electric potential provided by the fourth power pin, according to the above-described method. The second detection module 14 can include a fourth power detection circuit (i.e., similar to the power detection circuits 141, 142, and 143), which electrically connects the fourth power pin to the PCI device 200 and detects power provided to the PCI device 200 by the fourth power pin, according to the above-described method.

If the PCI connector 300 includes more than four power pins, the first detection module 11 can include more than two comparator units (i.e., similar to the first and second comparator units U1 and U2), and the second detection module 14 can include more than four power detection circuits (i.e., similar to the power detection circuits 141, 142, and 143). The additional comparator units and power detection units can be electrically connected to the additional power pins, to the processor 121, and to the PCI device 200 and detect the time sequences and power levels of electric potentials provided by the additional power pins, according to the above-described methods.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. An electrical parameter detection device for detecting electrical parameters of a peripheral component interconnect (PCI) connector including a plurality of power pins, comprising:
    a processor module;
    a first detection module electrically connected to the processor module and all of the power pins of the PCI connector, the processor module continuously detecting voltage values of electric potentials provided by each of the power pins of the PCI connector using the first detection module, and determining time sequences of the electric potentials provided by each of the power pins of the PCI connector according to the voltage values of the electric potentials provided by each of the power pins of the PCI connector; and
    a second detection module electrically connected to the processor module and all of the power pins of the PCI connector, the processor module detecting the amount of power provided by each of the power pins of the PCI connector using the second detection module.

2. The electrical parameter detection device as claimed in claim 1, wherein the first detection module includes a plurality of comparator units, the comparator units comparing the electric potentials provided by each of the power pins of the PCI connector with a predetermined reference electric potential to detect the time sequences of the electric potentials provided by each of the power pins of the PCI connector.

3. The electrical parameter detection device as claimed in claim 2, wherein each of the comparator units compares the electric potential provided by at least one of the power pins of the PCI connector with the reference electric potential, and outputs a relatively higher voltage level to the processor module when the electric potential provided by the power pin is higher than the reference electric potential, and outputs a relatively lower voltage level to the processor module when the electric potential provided by the power pin is lower than the reference electric potential.

4. The electrical parameter detection device as claimed in claim 3, wherein each of the comparator units includes two output pins corresponding to two of the power pins of the PCI connector, and compares the electric potentials provided by the two power pins with the reference electric potential; and each of the two output pins outputs the relatively higher voltage level to the processor module when the electric potential provided by the power pin corresponding to the output pin is higher than the reference electric potential, and outputs the relatively lower voltage level to the processor module when the electric potential provided by the power pin corresponding to the output pin is lower than the reference electric potential.

5. The electrical parameter detection device as claimed in claim 2, wherein the reference electric potential is generated by the processor module.

6. The electrical parameter detection device as claimed in claim 1, wherein the second detection module includes a plurality of power detection circuits corresponding to all of the power pins of the PCI connector, and each of the power pins is electrically connected to a PCI device via the power detection circuit corresponding to the power pin to provide the electric potentials to the PCI device, and is further electrically connected to the processor module via the power detection circuit corresponding to the power pin.

7. The electrical parameter detection device as claimed in claim 6, wherein each of the power detection units includes a differential amplifier circuit, a voltage divider circuit, and a resistor, the differential amplifier circuit and the resistor are electrically connected in parallel between the power pin corresponding to the power detection circuit and the PCI device, the voltage divider circuit is electrically connected between the resistor and the PCI device, and both the differential amplifier circuit and the voltage divider circuit are electrically connected to the processor module.

8. The electrical parameter detection device as claimed in claim 7, wherein the processor module detects a value of current passing through the resistor of each of the power detection units by the differential amplifier circuit, detects a value of the electric potential provided by the power pin corresponding to the power detection circuit by the voltage divider circuit, and thereby calculates the amount of power provided by the power pin corresponding to the power detection circuit.

* * * * *